US007215763B1

(12) United States Patent
Keller et al.

(10) Patent No.: US 7,215,763 B1
(45) Date of Patent: May 8, 2007

(54) SELF-CALIBRATION PROCEDURE IN PHYSICAL LAYER TRANSCEIVER FOR HOME TELEPHONE WIRE NETWORK

(75) Inventors: Philip Keller, Fremont, CA (US); Colin Nayler, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/336,709

(22) Filed: Jun. 21, 1999

(51) Int. Cl.
*H04M 1/00* (2006.01)
(52) U.S. Cl. .............................. 379/399.01; 379/93.05; 379/27.01
(58) Field of Classification Search ................ 375/219, 375/220, 229, 231, 1.01, 26.01, 27.01, 93.01, 375/93.05, 399.01
See application file for complete search history.

(56) References Cited

U.S. PATENT DOCUMENTS 4,637,064 A * 1/1987 Roberts et al. ............. 375/231
6,029,047 A * 2/2000 Ishida et al. ............. 379/93.07
6,069,899 A * 5/2000 Foley ....................... 379/90.01

* cited by examiner

*Primary Examiner*—Jefferey Harold
(74) *Attorney, Agent, or Firm*—McDermott Will & Emery LLP (57) ABSTRACT

A novel method of configuring a physical layer transceiver for providing data communications via residential wiring. A transmit section of the transceiver produces a pulse signal having selected amplitude. This pulse signal received by an input circuit in a receiver section of the transceiver is used for adjusting the gain of the input circuit to a fixed optimum level. In particular, the gain of the input circuit may be adjusted in response to at least one pulse. A calibration circuit of the transceiver includes a comparator for comparing the receive signal produced at the output of the input circuit, with a threshold level, and controller that supplies the input circuit with a gain control value, and sets the threshold level. The controller reduce the gain control value to decrease the gain of the input circuit when the receive signal exceeds the threshold level. The gain control value is increased to raise the gain of the input circuit when the receive signal is less than the threshold level.

17 Claims, 6 Drawing Sheets

SELF-CALIBRATION PROCEDURE IN PHYSICAL LAYER TRANSCEIVER FOR HOME TELEPHONE WIRE NETWORK

FIELD OF THE INVENTION

The present invention relates to network interfacing, and more particularly, to method and system for performing self-calibration in a physical layer transceiver for data communications over existing residential telephone line wiring.

BACKGROUND ART

Local area networks use a network cable or other media to link stations on the network. Each local area network architecture uses a media access control (MAC) enabling network interface cards at each station to share access to the media.

Conventional local area network architectures use media access controllers operating according to half-duplex or full duplex Ethernet (ANSI/IEEE standard 802.3) protocol using a prescribed network medium, such as 10 BASE-T. Newer operating systems require that a network station to be able to detect the presence of the network. In an Ethernet 10 BASE-T environment, the network is detected by the transmission of a link pulse by the physical layer (PHY) transceiver. The periodic link pulse on the 10 BASE-T media is detected by a PHY receiver, which determines the presence of another network station transmitting on the network medium based on detection of the periodic link pulses. Hence, a PHY transceiver at Station A is able to detect the presence of Station B, without the transmission or reception of data packets, by the reception of link pulses on the 10 BASE-T medium from the PHY transmitter at Station B.

Efforts are underway to develop an architecture that enables computers to be linked together using conventional twisted pair telephone lines instead of established local area network media such as 10 BASE-T. Such an arrangement, referred to herein as a home telephone wire network environment, provides the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard Plain Old Telephone System (POTS) telephones, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of transmit data from the received pulse becomes substantially difficult.

Moreover, parameters of the receiver circuitry vary from chip to chip and from run to run. Variations in receiver parameters in addition to variations in a received network signal limit the sensitivity of the receiver and further aggravate the problem of transmit data recovery. Therefore, it would be desirable to provide a physical layer transceiver capable of performing self-calibration to optimize its reception characteristics.

DISCLOSURE OF THE INVENTION

The present invention provides a novel method of configuring a physical layer transceiver for providing data communications via residential wiring. The method comprises the steps of transmitting a pulse signal having a selected amplitude by a transmit section of the transceiver, and receiving this pulse signal by an input circuit in a receiver section of the transceiver to produce a receive signal representing the transmitted pulse signal. The gain of the input circuit is adjusted so as to produce the receive signal at a predetermined level.

In accordance with a preferred embodiment of the invention, the gain of the input circuit may be adjusted to an optimum fixed level during initialization of the transceiver.

For example, the transmitted pulse signal may comprise a plurality of access identification pulses preceding data pulses to identify a transmitting network station. The gain of the input circuit may be adjusted in response to at least one of the access identification pulses.

Preferably, the step of gain adjustment comprises comparing amplitude of the receive signal with a preset threshold level. The gain is reduced if the amplitude of the receive signal exceeds the threshold level. However, the gain is increased if the amplitude of the receive signal is less that the threshold level.

The method of the present invention may be employed in a transceiver that comprises an input circuit for receiving an incoming pulse signal, an output circuit for transmitting a transmit signal having a selected amplitude, and a calibration circuit. In response to the transmit signal, the input circuit produces a receive signal used by the calibration circuit for adjusting the gain of the input circuit so as to set the receive signal to a predetermined level.

In accordance with a preferred embodiment, the input circuit may include an input amplifier for amplifying the incoming signal and an envelope detector for producing an envelope signal representing the incoming signal. The calibration circuit is configured for adjusting the gain of the input amplifier. In particular, the calibration circuit adjusts the gain of the input amplifier, when the input circuit responds to at least one of the identification pulses.

The calibration circuit may comprise a comparator arranged at an output of the input circuit for comparing the receive signal with a threshold level, and a controller that supplies the input circuit with a gain control value, and sets the threshold level. The controller may reduce the gain control value to decrease the gain of the input circuit when the receive signal exceeds the threshold level. The gain control value is increased to raise the gain of the input circuit when the receive signal is less than the threshold level.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention.

Accordingly, the drawings and description are to be regarded as illustrative in nature, and not as restrictive.

BEST MODE FOR CARRYING-OUT THE INVENTION

Figure 1:
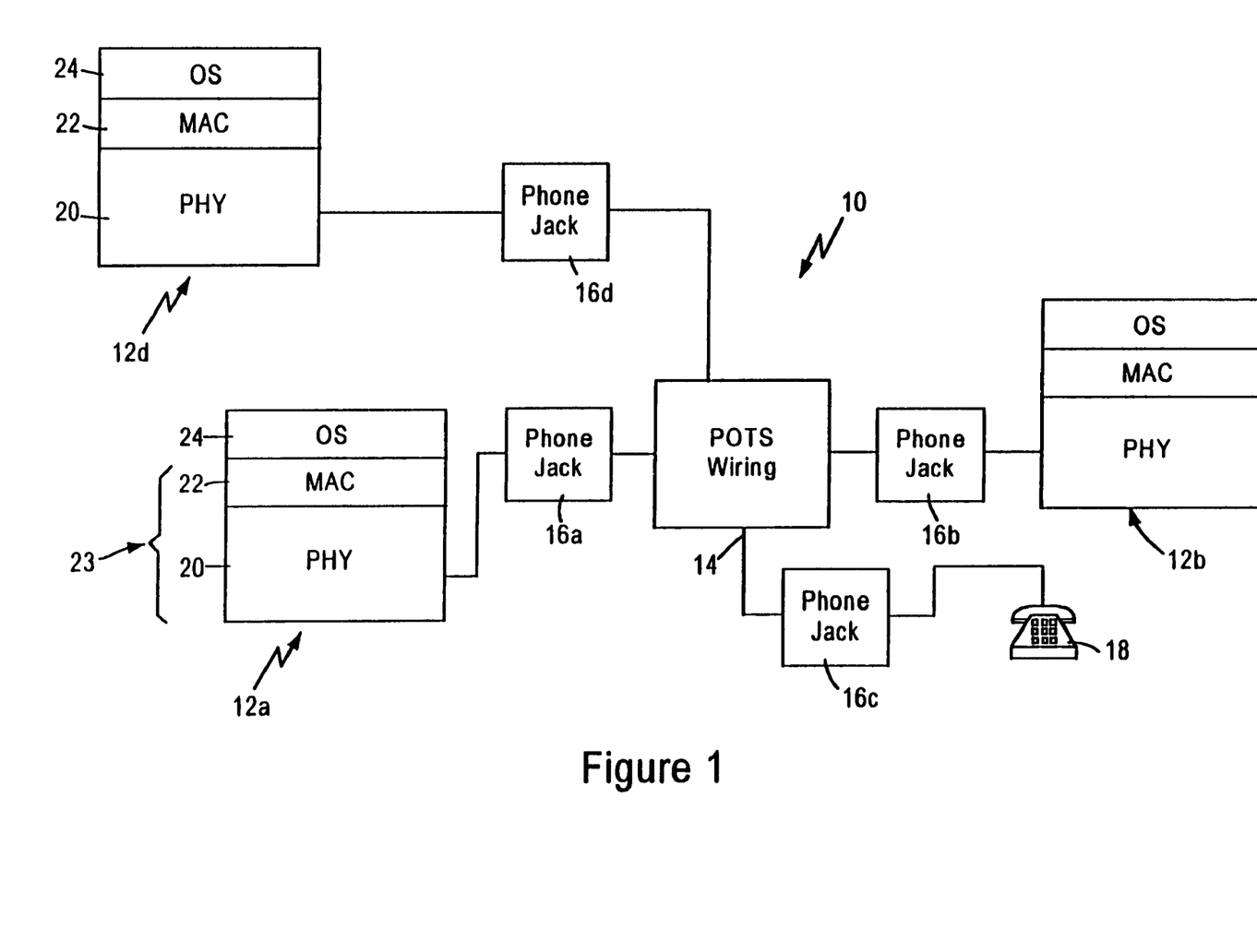
FIG. 1 is a block diagram illustrating a local area network deployed over residential twisted pair wiring.

FIG. 1 is a diagram of a home telephone wire network 10 according to an embodiment of the invention, using existing residential wiring such as twisted pair telephone line wiring as network media. As shown in FIG. 1, the network 10 supporting the Ethernet (IEEE 802.3) standard includes network stations 12a and 12b that are connected to a twisted pair telephone line wiring 14, via RJ-11 phone jacks 16a and 16b respectively. A telephone 18 connected to the RJ-11 phone jack 16c may continue to make phone calls while stations 12a and 12b are communicating.

As shown in FIG. 1, each network station 12, for example a personal computer, printer, or intelligent consumer electronics device, includes a physical layer (PHY) transceiver 20, a media access (MAC) layer 22, and an operating system (OS) layer that performs higher layer function according to the OSI reference model.

Figure 2A:
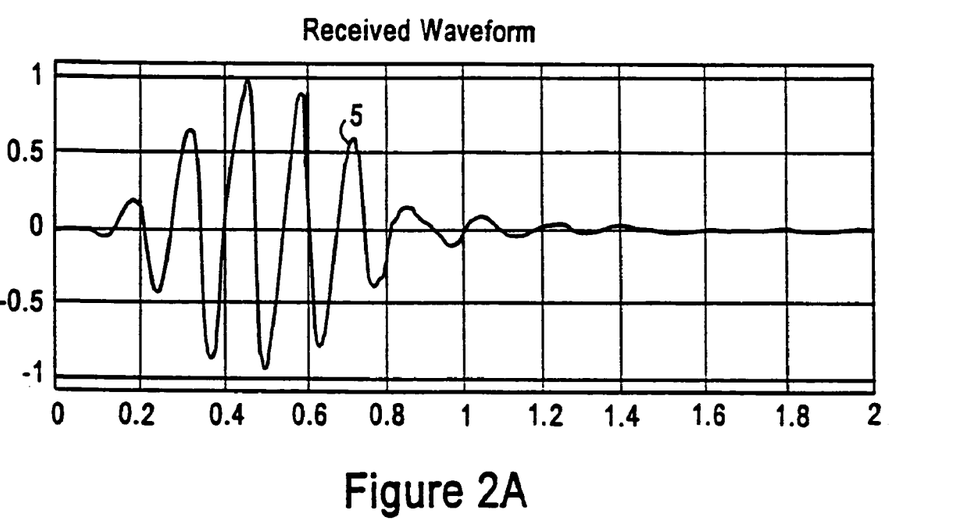
FIGS. 2A, 2B, 2C and 2D are diagrams illustrating processing of received waveforms by the physical layer transceiver of FIG. 1 according to an embodiment of the present invention.
Figure 2B:
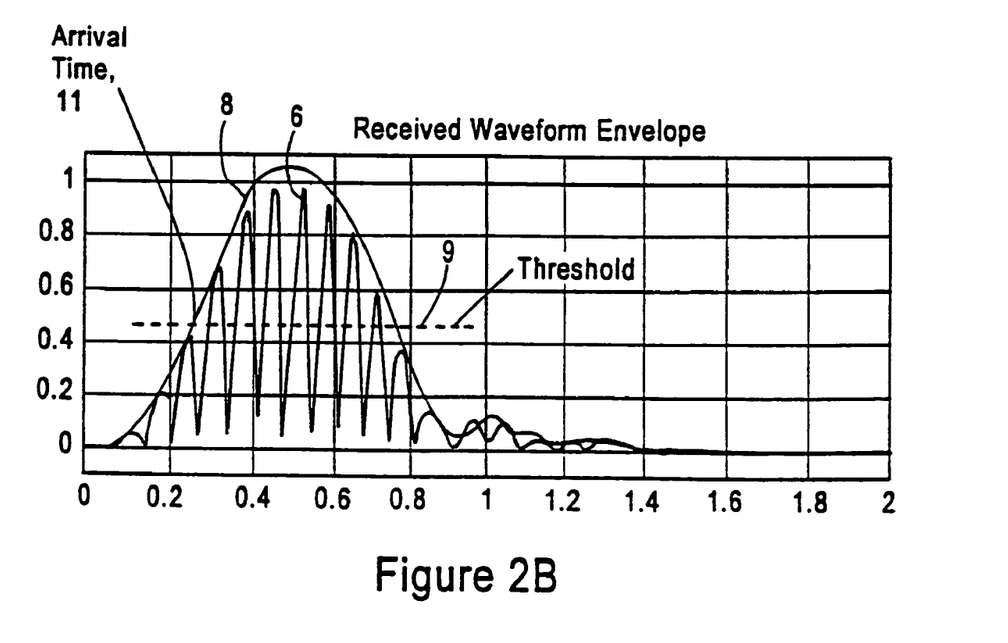

The stations 12a and 12b communicate by transmitting band-limited pulses that carry network data modulated in the analog network signals. In particular, the physical layer transmitter transmits a band-limited pulse 5, illustrated in FIG. 2A. The arrival position of a received pulse is detected using a waveform envelope 8 representing the absolute value 6 of the received signal, shown in FIG. 2B. The envelope 8 is supplied to a slicing circuit described below, having a threshold level 9 selected to identify the arrival position 11 of the received pulse. When the envelope 8 crosses the threshold level 9, the slicing circuit detects the arrival position 11 of the pulse as an event representing a data pattern. This event can be used to recover a transmit clock and transmit data from the received signal.

Figure 2C:
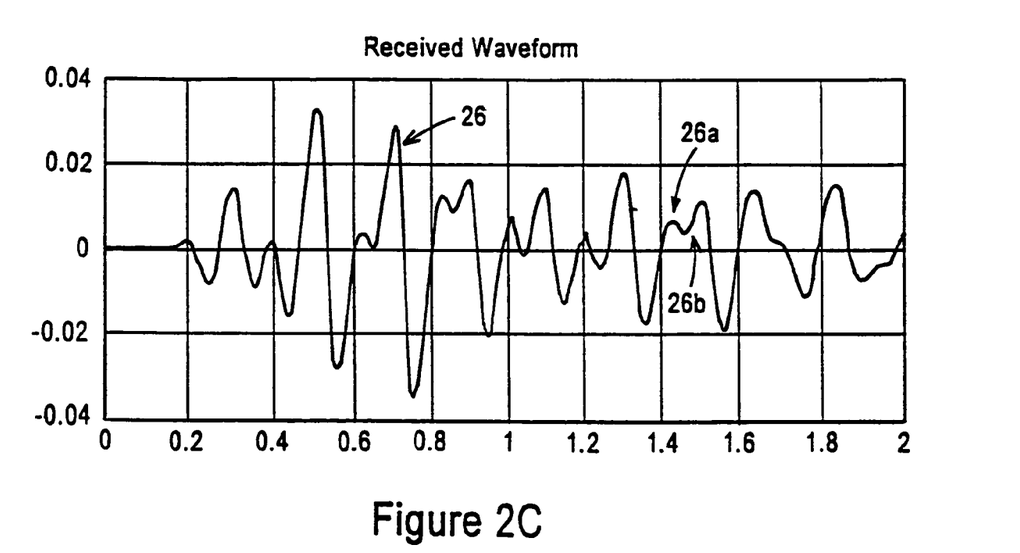
Figure 2D:
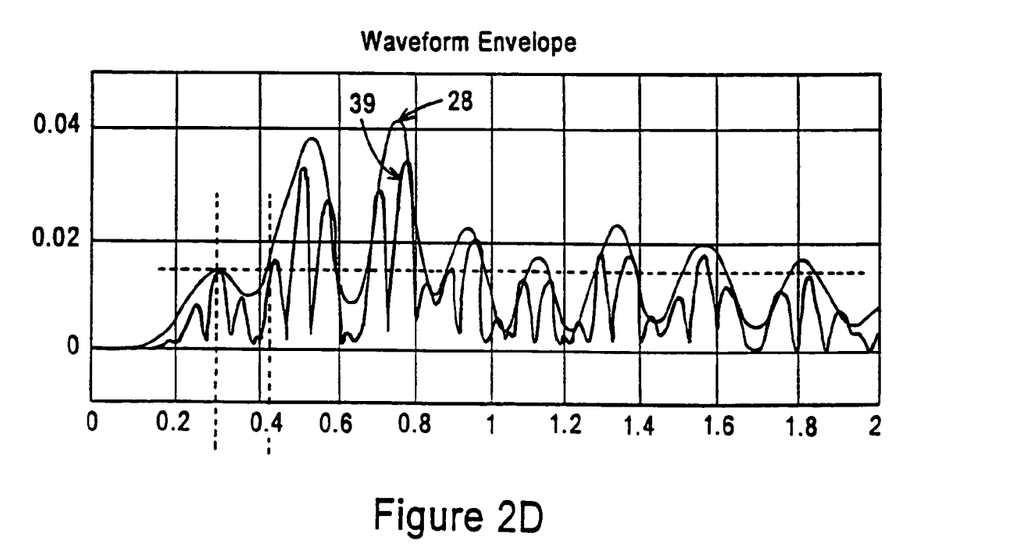

However, in telephone wire networks, the received envelope waveform depends largely on the wiring topology. As the wiring topology may cause multiple signal reflections, the shape of a received pulse may be so distorted that the envelope may have multiple localized maximum points. In addition, the wiring topology in the home network is variable. Hence the distortion of the received pulse is unpredictable, resulting in a waveform 26 as shown in FIG. 2C. As shown in FIG. 2C, the distorted waveform 26 of a received pulse signal has multiple localized maximum and minimum points 26a and 26b due to wiring topology. FIG. 2D illustrates the envelope waveform 28 of the distorted waveform 26. Hence, if a threshold value is not properly set for detection of a data pulse, a slicing circuit may identify multiple pulse positions at which crosses a threshold level. As a result, a unique time value for the position of a received pulse may not be detected resulting in data recover errors.

According to the disclosed embodiment, an adaptive physical layer transceiver architecture is capable of self-calibration to adjust the signal processing circuitry on the receive side to optimize accurate recovery data from the transmitted network signals. In particular, the improvement of reception characteristics, for example, selecting an optimum gain of receiving circuits enables the transmitted data packet to be more reliably received by a receiving network station, reducing the bit error rate of received data packets.

Figure 3:
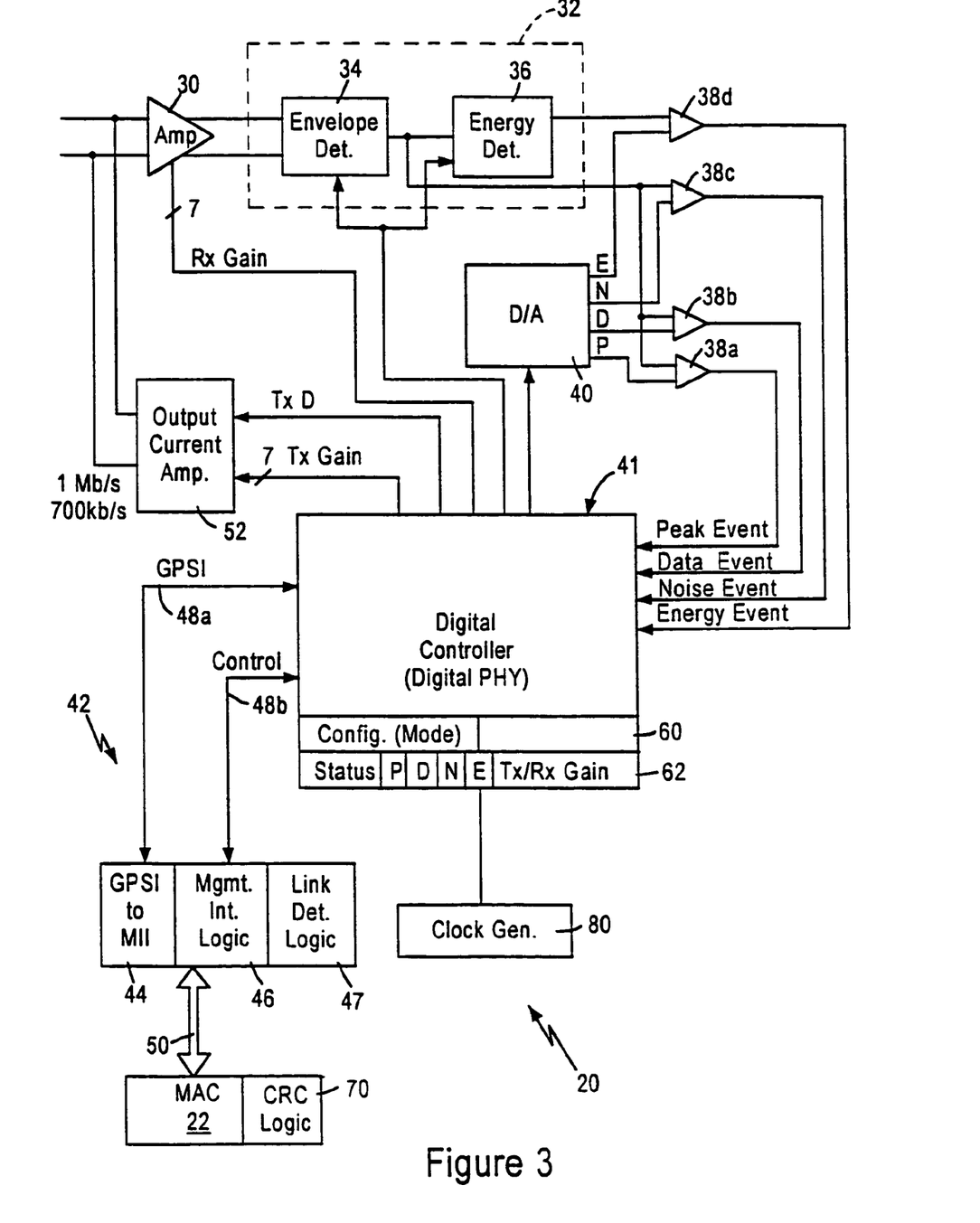
FIG. 3 is a block diagram illustrating the architecture of the physical layer transceiver of FIG. 1 according an embodiment of the present invention.

FIG. 3 is a block diagram of the physical layer transceiver 20 according to an embodiment of the present invention. As shown in FIG. 3, the physical layer transceiver 20 includes an input amplifier 30 for amplifying analog network signals received from the telephone medium, such as the network signals shown in FIG. 2C. The physical layer transceiver 20 also includes a signal conditioning circuit 32 that includes an envelope detection circuit 34 and an energy detection circuit 36. The envelope detection circuit 34 is responsive to the amplified received signal 26 to generate the envelope signal 28. For example, the envelope detector 34 includes an absolute value circuit (e.g., a rectifier circuit) that generates an absolute value signal 39 representing the absolute value of the amplified received signal 26, and a low pass filter coupled to the rectifier circuit for filtering out high-frequency components of the rectified signal, resulting in the envelope signal 28. The envelope signal 28 is output from the envelope detector 34 and supplied to the energy detector 36. The energy detector 36 includes an integrator that performs the mathematical process of integration of the envelope signal 28 over time to produce a signal proportional to energy of the received pulse signal.

As shown in FIG. 3, physical layer transceiver 20 also includes slicer circuits 38a, 38b, 38c and 38d, and a digital to analog (D/A) converter 40 for supplying analog threshold signals to the slicer circuits 38. The physical layer transceiver 20 also includes a digital controller 41 configured for controlling the digital analog converter 40 to output threshold signals supplied to the slicer circuits 38.

The digital controller 41 is configured for controlling the threshold values applied to the slicers 38a, 38b, 38c and 38d based on the signals supplied by the slicers 38 to the digital controller 41. In particular, slicer circuit 38a outputs a peak event signal indicating with respect to time whether the envelope signal 28 exceeds a peak threshold (P) supplied by the digital to analog converter 40 under the control of the digital controller 41. Slicer circuits 38b and 38c output data event signals and noise event signals indicating with respect to time whether the envelope signal 28 exceeds a data transition threshold (D) and a noise threshold (N), respectively. The slicer circuit 38d outputs an energy event signal indicating with respect to time whether the energy signal output by energy detector 36 exceeds an energy threshold (E) supplied by the D/A converter 40.

Hence, the slicer circuits 38a, 38b, and 38c output peak, data transition, and noise event signals indicating with respect to time whether the envelope signal 28 exceeds a peak threshold (P), a data transition threshold (D), and a noise threshold (N), respectively. Slicer 38d outputs an energy event signal indicating with respect to time whether the energy signal from the energy detector 36 exceeds an energy threshold (E).

The digital controller 41 controls the noise, peak, data transition and energy thresholds based on the noise event signals and the peak event signals output by the slicers 38c and 38a, respectively, and produces a digital data signal based on the arrival position of the received pulse detected using either the energy event signal or the data event signal. The digital data signal is output to the media access controller 22 via a media independent interface (MII) 50.

The physical layer transceiver 20 also includes a transmitter portion 52 (e.g., an output current amplifier), that converts transmit data (TxD) produced by the digital controller 41 to an analog network signal. The analog network signal is output at a selected one of 128 output gain values based on a 7-bit transmit gain (TxGain) signal output by the digital controller 41.

Further, the physical layer transceiver 20 comprises an output interface 42 including a Media-Independent Interface (MII) to general purpose serial interface (GPSI) converter 44, management interface logic 46, and buses 48*a* and 48*b*. The bus 48*a* transfers transmit and receive data between the MAC 22 and the digital controller 41 in GPSI format. The converter 44 converts the GPSI format data to nibble-wide data for transfer to the MAC 22 via the MII 50. Similarly, transmit data from the MAC 22 supplied via the MII 50 is converted from nibble-wide data to GPSI format, and supplied to the digital controller 41 via the GPSI data bus 48*a*.

The output interface 42 also includes a control data bus 48*b* for transferring configuration data and status information between the digital converter 41 and the management interface logic 46. In particular, the management interface logic 46 is configured for storing at selected control registers 60 configuration data received from the MAC 22 via the MII 50 into the digital controller 41. Note that the threshold value E for the energy detector slicer circuit 38*d* may be supplied by the management agent via the MII 50 and set in the configuration registers 60. The digital controller 41 also comprises status registers 62 that include, for example, the threshold values for the threshold signals P, D, and E, and the 7-bit output amplifier gain control signal TxGain.

The output interface 42 also includes link detection logic 47 for determining whether a valid link is detected on the network medium 14. If no valid access identification (AID) sequence is detected within three successive detection intervals, each having a preferred duration of about 800 milliseconds, the link status is sent to an invalid state. AID replaces the preamble conventionally used in 10 Base-T Ethernet (IEEE 802.3) systems. AID is a specific identifier, which is unique for each network station 12. For example, AID may be a series of 8 pulses output from the PHY transceiver 20 of the transmitting station onto the telephone medium 14, where the time intervals between the first pulse and the successive 7 pulses define respective values. For instance, assume a second pulse is output by the PHY transceiver 20 following a first pulse after time interval T1. If T1 equals 66 clock cycles (assuming a 116 nanosecond clock), the corresponding value is 00; if T1 equals 86, 106, or 126 clock cycles, the values are 01, 10, or 11, respectively, where the maximum interval between pulses is 128 clock cycles. The same arrangement is used to detect the values representing time intervals T2, T3, T4, T5, T6 and T7 between the first pulse and each of the 6 pulses following the second pulse. Hence, the presence of the valid AID can be determined by detecting a first pulse, and detecting a presence of 7 successive pulses using detection windows having predetermined duration, for example, 128 clock cycles.

Figure 4:
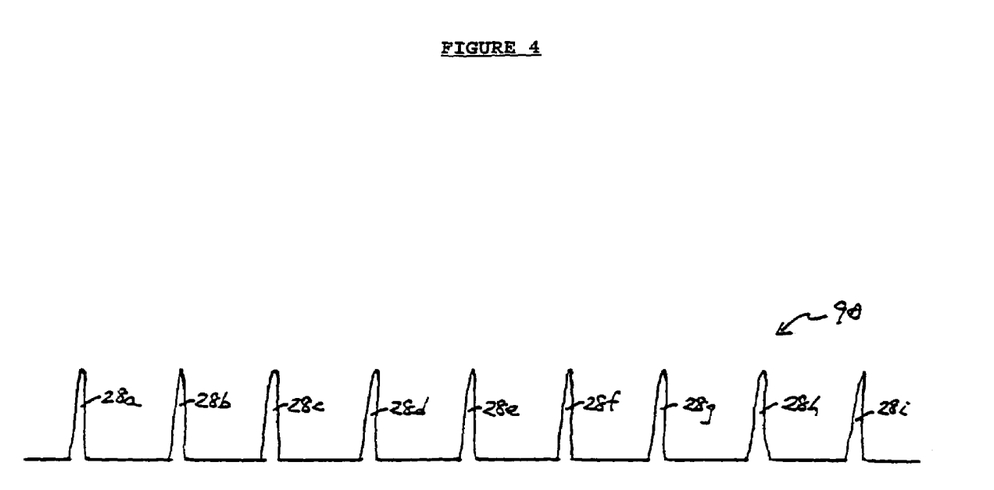
FIG. 4 is a diagram illustrating the access identification interval of the present invention.

As shown in FIG. 4 that illustrates a sequence of envelope pulses 28 used to define an AID interval 90, eight AID envelope pulses 28*a*, 28*b*, 28*c*, 28*d*, 28*e*, 28*f*, 28*g* and 28*h* are inserted before the data packet, which begins with the envelope pulse 28*i* contiguously following the last AID envelope pulse 28*h*. As described above, the envelope pulses 28 are generated by the envelope detector 34 in response to received network signals 5.

The reception characteristics, such as the gain of the input amplifier 30, substantially vary from one transceiver chip to another depending on various process parameters. For example, the receiver gain may vary by up to 50%.

Therefore, there is a need for calibrating the receiver circuit to a predetermined level, in order to maintain consistent reception characteristics of all physical layer transceivers in the network 10.

In particular, in accordance with the present invention, the input amplifier 34 is calibrated during an initialization period, for example, at power-up. A known transmit signal at the output of the transmitter 52 may be used as a calibration signal. As discussed above, the transmit signal is output at a selected one of 128 output gain values based on a 7-bit transmit gain (TxGain) signal output by the digital controller 41. Thus, the transmitter 52 provides 128 different levels, which may be in the range from millivolts to about 2 volts.

A transmit signal supplied to the network 10 is received by all transceivers 20 in the network including the transceiver that transmitted this signal. Thus, the transmit signal output by the transmitter 52 of a transceiver 20 is received by the receiver side of that transceiver 20. This feature makes it possible for the transceiver 20 to perform calibration of the reception circuit using a known signal output by the transmitter.

In accordance with a disclosed embodiment, the transceiver 20 performs calibration of the input amplifier 30. However, the self-calibration procedure of the present invention also enables the user to calibrate such reception elements as the envelope detector 34 and the energy detector 36.

The self-calibration procedure may be performed at power-up during the initialization of the transceiver 20. For example, AID transmit pulses formed by the transmitter 52 may be used as a calibration pulse stream. In response to the AID pulses of a selected level, the gain of the input amplifier is adjusted to an optimum value that provides a predetermined signal level at the output of the envelope detector 34 or energy detector 36.

As discussed above, telephone wiring topology may cause the network signal from one network station to have a peak-to-peak voltage on the order of 10 to 20 millivolts, whereas network signals from another network station may have a value on the order of one to two volts. If the incoming signal is substantially large, the gain of the input amplifier 30 should be small enough to prevent the output signal of the input amplifier 30 from causing saturation of the receiver circuitry. Conversely, smaller network signals require a higher gain of the input amplifier 30 to enable the envelope detector 24 and the energy detector 36 to accurately process the signals.

The calibration procedure of the present invention sets an optimum fixed gain of the input amplifier 30 to enable the amplifier to amplify the incoming signals to the maximum possible level that does not cause the saturation of the receiver circuitry. A circuit for performing a self-calibration procedure in accordance with a disclosed embodiment includes the digital controller 41 and the slicer circuit 38. For example, the slicer 38*a* at the output of the envelope detector 34 may be used. Alternatively, the slicer 38*b* may be included in the circuit for performing self-calibration.

The digital controller 41 sets the 7-bit transmit gain signal TxGain to a value selected to provide a desired output level of the output current amplifier 52. An AID pulse produced at the output of the current amplifier 52 at the transmit side of the transceiver 20 are received at the receive side of the same transceiver. The received pulse is amplified by the input amplifier 30 having its gain set by an initial amplifier gain control value supplied by the digital controller 41. For example, a 3-bit amplifier gain control (AGC) value may be used for setting the gain of the input amplifier 30.

The amplified received pulse is processed by the envelope detector 34 that produces an AID envelope pulse 28 (FIG. 4). As discussed in more detail later, the slicer circuit 38*a* compares the peak amplitude of the envelope pulse 28 with a test level established by the digital controller 41 so as to adjust the gain of the input amplifier 30 to an optimum level. The output of the slicer circuit 38*a* is supplied to the digital controller 41 that reduces the initial gain control value to decrease the gain of the input amplifier 30, if the peak value of the envelope pulse 28 exceeds the test level. However, if the peak value of the envelope pulse 28 is lower than the test level, the digital controller 41 raises the initial gain control value to increase the gain of the input amplifier 30.

Figure 5:
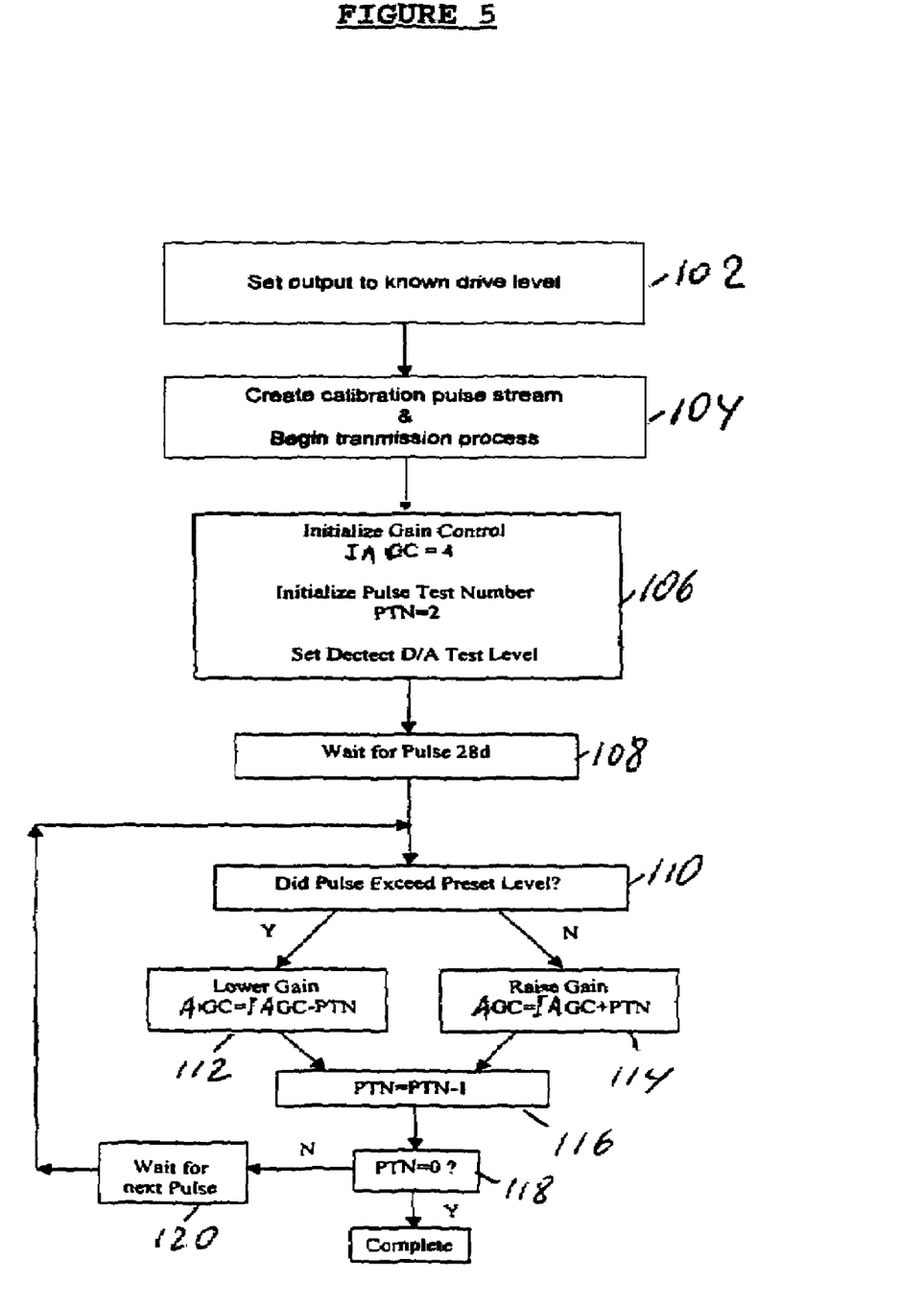
FIG. 5 is a flow diagram illustrating a method of calibration according to an embodiment of the present invention.

In accordance with the disclosed embodiment, a binary search may be employed for setting the input amplifier gain control value to an optimum level. As shown in FIG. 5 that illustrates the self-calibration procedure of the present invention, at power-up or during an initialization procedure, the digital controller 41 sets the transmit gain control signal TxGain to a selected value that provides a desired output of the transmitter 52 (block 102). For example, the output of the transmitter 52 may be set to a level corresponding to the maximum value in the dynamic range (i.e., linear region) of the receiver circuitry. Then, the transceiver 20 is controlled to begin transmission process (block 104). The transmit signal output by the transceiver 20 is used as a calibration pulse stream for setting the gain of the input amplifier 30.

In addition to setting the TxGain signal, the digital controller 41 sets an initial amplifier gain control (IAGC) value for establishing the initial gain of the input amplifier 30 (block 106). For example, when a 3-bit amplifier gain control value is employed, the initial amplifier gain control value may be set to IAGC=4 (binary 100). Hence, the amplifier gain control value may be initially set to about the middle of the input amplifier gain control range (from binary 000 to binary 111).

Also, the digital controller 41 initializes a pulse test number (PTN) that defines the maximum number of iterations in the successive approximation algorithm used for the input amplifier gain adjustment and may determine the increment for the adjustment procedure. For example, the pulse test number may be initially set to PTN=2 to perform up to 3 iterations (from PTN=2 to PTN=0).

Further, the digital controller 41 sets an input amplifier test level used as a threshold for input amplifier gain control. For example, the input amplifier test level may be set to a level corresponding to the maximum value of the dynamic reception range of the physical layer transceiver 20.

Then, the digital controller 41 waits until a predetermined AID pulse is received (block 108). For example, the digital controller 41 may wait until the fourth AID pulse corresponding to the envelope pulse 28*d* (FIG. 4) is received.

The peak amplitude of the AID envelope pulse 28*d* produced at the output of the envelope detector 34 is compared by the slicer circuit 38*a* with the input amplifier test level (block 110). The test level value supplied to the slicer circuit 38*a* is transformed into an analog form by the D/A converter 40. If the digital controller 41 detects that the value of the envelope pulse 28*d* exceeds the test level, it lowers the gain of the input amplifier 30 by reducing the gain control value supplied to the input amplifier 30. (block 112). For example, the digital controller 41 may reduce the initial gain control value IAGC value by the PTN value.

If the peak value of the envelope pulse 28*d* is less than the input amplifier test level, the digital controller 41 raises the gain of the input amplifier 30 by increasing the IAGC value (block 114). For example, the IAGC value may be increased by the PTN value.

Then, the PTN is decremented by one (block 116), and the digital controller 41 determines whether the new PTN value is equal to 0 (block 118). If not, the system waits for the next AID pulse, for example, the envelope pulse 28*e* (block 120). The peak value of the envelope pulse 28*e* is compared by the slicer circuit 38*a* with the input amplifier test level, and step 112 or 114 is repeated depending on whether the envelope pulse value is higher or lower than the test level.

The input amplifier gain control procedure is performed until the digital controller in step 118 detects that PTN=0. Thus, in accordance with the disclosed embodiment, AID pulses 28*d*, 28*e* and 28*f* are used for adjusting the gain of the input amplifier 30.

Hence, at power-up or during the initialization procedure, a known level of AID pulses produced by the transmitter 52 is used by the physical layer transceiver 20 of the present invention to calibrate the input amplifier 30 by adjusting its gain to a fixed optimum level, for example, corresponding to the maximum level of the reception dynamic range. As a result, the present invention reduces the effects of process variations that limit the receiver sensitivity.

Those skilled in the art will recognize that the present invention admits of a number of modifications, within the spirit and scope of the inventive concepts. For example, the input amplifier gain control procedure may be implemented in a number of different ways. For instance, the input amplifier gain control value may be initially set to the maximum level, and then reduced to a desired optimum level.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of configuring a transceiver for providing data communications via residential telephone line wiring, the method comprising the steps of:
    transmitting a pulse signal having a selected amplitude by a transmit section of the transceiver, receiving the pulse signal by an input circuit in a receiver section of the transceiver to produce a receive signal representing the pulse signal, and
    adjusting gain of the input circuit so as to produce the receive signal at a predetermined level.

2. The method of claim 1, wherein the gain of the input circuit is adjusted to a fixed level during initialization of the transceiver.

3. The method of claim 1, wherein the transmitted pulse signal comprises a plurality of access identification pulses preceding data pulses to identify a transmitting network station.

4. The method of claim 3, wherein the gain of the input circuit is adjusted in response to at least one of the access identification pulses.

5. The method of claim 1, wherein the step of adjusting gain comprises comparing amplitude of the receive signal with a preset threshold level.

6. The method of claim 5, wherein the gain is reduced if the amplitude of the receive signal exceeds the threshold level.

7. The method of claim 6, wherein the gain is increased if the amplitude of the receive signal is less that the threshold level.

8. A transceiver for providing data communications over residential telephone line wiring, comprising:
   an input circuit for receiving an incoming signal,
   an output circuit for transmitting a transmit signal having a selected amplitude, and
   a calibration circuit responsive to a receive signal produced by the input circuit in response to the transmit signal for adjusting gain of the input circuit so as to set the receive signal to a predetermined level.

9. The transceiver of claim 8, wherein the input circuit includes an input amplifier for amplifying the incoming signal and an envelope detector for producing an envelope signal representing the incoming signal.

10. The transceiver of claim 9, wherein the calibration circuit is configured for adjusting gain of the input amplifier.

11. The transceiver of claim 8, wherein the transmit signal comprises a plurality of identification pulses for identifying a transmitting station.

12. The transceiver of claim 11, wherein the calibration circuit is configured to adjust the gain of the input circuit, when the input circuit responds to at least one of the identification pulses having the selected amplitude.

13. The transceiver of claim 12, wherein the calibration circuit comprises a comparator arranged at an output of the input circuit for comparing the receive signal produced in response to the at least one of the identification pulses, with a threshold level.

14. The transceiver of claim 13, wherein the calibration circuit further comprises a controller for supplying the input circuit with a gain control value.

15. The transceiver of claim 14, wherein the controller is configured for reducing the gain control value to decrease the gain of the input circuit when the receive signal exceeds the threshold level.

16. The transceiver of claim 15, wherein the controller is configured for increasing the gain control value to raise the gain of the input circuit when the receive signal is less than the threshold level.

17. The transceiver of claim 16, wherein the controller is configured for setting the threshold level.

* * * * *